United States Patent
Goutte

(10) Patent No.: US 7,813,919 B2
(45) Date of Patent: Oct. 12, 2010

(54) CLASS DESCRIPTION GENERATION FOR CLUSTERING AND CATEGORIZATION

(75) Inventor: Cyril Goutte, Bernin (FR)

(73) Assignee: Xerox Corporation, Norwalk, CT (US)

( * ) Notice: Subject to any disclaimer, the term of this patent is extended or adjusted under 35 U.S.C. 154(b) by 1202 days.

(21) Appl. No.: 11/312,764

(22) Filed: Dec. 20, 2005

(65) Prior Publication Data

US 2007/0143101 A1  Jun. 21, 2007

(51) Int. Cl.
G06F 17/27 (2006.01)
G06F 17/20 (2006.01)
G06F 17/30 (2006.01)

(52) U.S. Cl. .............................. 704/9; 704/1; 707/711; 707/737

(58) Field of Classification Search ........................ None
See application file for complete search history.

(56) References Cited

U.S. PATENT DOCUMENTS

| | | | |
|---|---|---|---|
| 5,703,964 A | | 12/1997 | Menon et al. |
| 5,857,179 A | * | 1/1999 | Vaithyanathan et al. ......... 707/2 |
| 6,104,835 A | * | 8/2000 | Han ............................ 382/225 |
| 6,137,911 A | | 10/2000 | Zhilyaev |
| 6,424,971 B1 | | 7/2002 | Kreulen et al. |
| 6,862,586 B1 | | 3/2005 | Kreulen et al. |
| 6,931,347 B2 | * | 8/2005 | Boedi et al. .................. 702/137 |
| 7,031,909 B2 | * | 4/2006 | Mao et al. ........................ 704/9 |
| 7,085,771 B2 | * | 8/2006 | Chung et al. ........................ 1/1 |
| 2003/0167163 A1 | | 9/2003 | Glover et al. |
| 2003/0233232 A1 | * | 12/2003 | Fosler-Lussier et al. ..... 704/251 |
| 2005/0187892 A1 | | 8/2005 | Goutte et al. |
| 2006/0093188 A1 | * | 5/2006 | Blake et al. .................. 382/103 |
| 2006/0136410 A1 | | 6/2006 | Gaussier et al. |
| 2006/0287848 A1 | * | 12/2006 | Li et al. ........................... 704/9 |
| 2007/0005340 A1 | | 1/2007 | Goutte et al. |
| 2007/0005639 A1 | | 1/2007 | Gaussier et al. |
| 2007/0067289 A1 | * | 3/2007 | Novak ........................... 707/6 |

OTHER PUBLICATIONS

Dhillon, I. Mallela, S. Kumar, R. "A divisive information-theoretic feature clustering algorithm for text classification" Journal of Machine Learning Research 2003, 1265-1287.*

Tomokiyo, T. Hurst, M. "A language model approach to keyphrase extraction" Proceedings of the ACL 2003 workshop on Multiword expressions: analysis, acquisition and treatment, p. 33-40, Jul. 12, 2003.*

Dobrokhotov, P. et al. "Combining NLP and probabilistic categorization for document and term selection for Swiss-Prot medical annotation" Bioinformatics, vol. 19, pp. i91-i94, 2003.*

(Continued)

Primary Examiner—Matthew J Sked
(74) Attorney, Agent, or Firm—Fay Sharpe LLP

(57) ABSTRACT

A class is to be characterized of a probabilistic classifier or clustering system that includes probabilistic model parameters. For each of a plurality of candidate words or word combinations, divergence of the class from other classes is computed based on one or more probabilistic model parameters profiling the candidate word or word combination. One or more words or word combinations are selected for characterizing the class as those candidate words or word combinations for which the class has substantial computed divergence from the other classes.

12 Claims, 1 Drawing Sheet

OTHER PUBLICATIONS

Dobrokhotov et al., "Combining NLP and probabilistic categorization for document and term selection for Swiss-Prot medical annotation," *Bioinformatics*, vol. 19 Suppl. 1, pp. i91-i94, 2003.

Radev et al., "Automatic summarization of search engine hit lists," ACL Workshop on Recent Advances in NLP and IR, pp. 99-109, 2000.

Dobrokhotov et al., "Combining NLP and Probabilistic Categorisation for . . . ," Oxford University Press, pp. 1-3, (2001).

Gaussier et al, "A Hierarchical Model for Clustering and Categorising Documents," Advances in Information Retrieval, pp. 229-247, (2002).

Goutte et al., "*Corpus-Based* vs. *Model-Based Selection of Relevant Features*," Proceedings of CORIA04, pp. 75-88, (2004).

Glover et al., "Using Web Structure for Classifying and Describing Web Pages," published at WWW2002, 8 pp, (2002).

Glover et al., "Inferring Hierarchical Descriptions," published at CIKM2002, 8 pp, (2002).

Popescul et al., "Automatic Labeling of Document Clusters," 16 pp, at http://www.cis.upenn.edu/~popescul/Publications/popescal00labeling.pdf, (2000).

\* cited by examiner

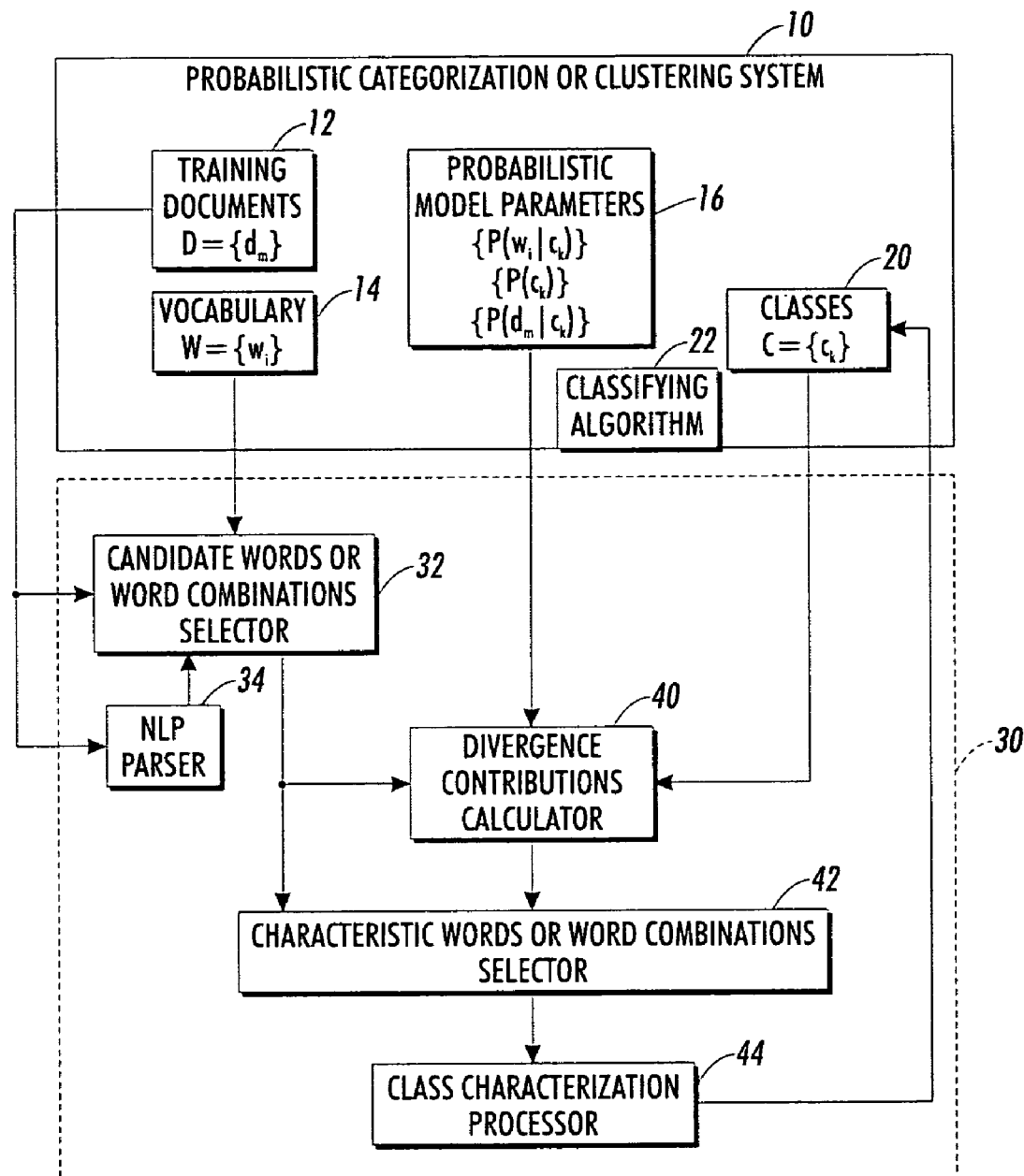

CLASS DESCRIPTION GENERATION FOR CLUSTERING AND CATEGORIZATION

BACKGROUND

The following relates to the information arts. It is described with example reference to providing keywords, semantic descriptions, or other characterization of classes of probabilistic clustering or categorization systems. However, the following is amenable to other like applications.

Automated clustering and categorization systems classify documents into classes on the basis of automated analysis of content. Categorization and clustering systems can employ soft or hard classification. In soft classification, a single document can be assigned to more than one class. In hard classification, also called partitioning, each document is assigned to a single class.

In probabilistic categorization systems, a set of training documents are typically annotated with class assignment information respective to a pre-defined structure of classes. Probabilistic model parameters are computed that profile the usage of selected vocabulary words or word combinations in training documents, in training documents assigned to classes, or in other content groupings of interest. An algorithm is developed for assigning unclassified documents to classes based on application of the probabilistic model parameters. Henceforth, the developed algorithm is used to assign received unclassified documents to suitable classes.

Probabilistic clustering systems operate similarly, except that in clustering the pre-defined class structure and training document class annotations are not provided. Rather, training documents are clustered during the training to define classes based, for example, on similar usage of vocabulary words or word combinations, or other common document characteristics.

As some illustrative examples, Naïve Bayes type probabilistic classifiers employ Bayesian conditional vocabulary word probabilities, assuming statistical independence of the conditional probabilities. Another type of probabilistic classifiers are the probabilistic latent classifiers (PLC), which are described for example in Goutte et al., U.S. Publ. Appl. 2005/0187892 A1, and in Gaussier et al., "A hierarchical model for clustering and categorizing documents", in "Advances in Information Retrieval Proceedings of the 24th BCS-IRSG European Colloquium on IR Research", vol. 2291 of Lecture Notes in Computer Science, pages 229 47 (Springer, 2002), Fabio Crestani, Mark Girolami, and Cornelis Joost van Rijsbergen, editors.

A problem arises in characterizing the classes of an automated clustering or categorization system. The classes are advantageously characterized by keywords, semantically descriptive phrases, sentences, or paragraphs, or so forth. Such characterization enables user browsing of the classification system by semantic description, or enables automated searching of the classification system using keywords, or so forth. Such class characterization substantially improves the efficiency and usefulness of the categorization or clustering system. However, deriving class-distinguishing keywords or semantic class descriptions is challenging.

One existing approach for characterizing classes of probabilistic categorizing or clustering systems is to identify as keywords for a class those vocabulary words that are most commonly used in the class. That is, vocabulary words that are most frequently used, or have the highest probability, in a class are assigned as keywords for that class. In a variant approach, the keywords for a class are limited to vocabulary words that are common to all documents in the class. Here, the user is sure that every document in the class contains the keyword.

These approaches have the disadvantage that common generic vocabulary words that occur frequently in more than one related class may be assigned as keywords for those related classes. For example, common computer-related words such as "keyboard", "screen", or "file" may be assigned as keywords for several different computer-related classes. Although these common generic keywords may help the user locate the group of computer-related classes, they typically provide little or no guidance to the user in refining the class selection to those computer-related classes that are of special interest to the user. The variant approach in which a keyword must be so common that it appears in every document of the class can further bias the class characterization toward selecting common generic terms as keywords.

CROSS REFERENCE TO RELATED PATENTS AND APPLICATIONS

The following U.S. patent applications relating generally at least to aspects of multiple view clustering and categorization are commonly assigned with the present application, and are incorporated herein by reference.

Goutte et al., "Method for Multi-Class, Multi-Label Categorization using Probabilistic Hierarchical Modeling," U.S. patent application Ser. No. 10/774,966 filed 9 Feb. 2004 and published as U.S. Publ. Appl. 2005/0187892 A1 on 25 Aug. 2005 and since issued as U.S. Pat. No. 7,139,754 is incorporated by reference herein in its entirety.

Gaussier et al., "Categorization including Dependencies between Different Category Systems", U.S. patent application Ser. No. 11/170,033 filed 29 Jun. 2005 and since published as U.S. Publ. Appl. 2007/0005639 A1 is incorporated by reference herein in its entirety.

The following U.S. patent applications relating generally at least to aspects of training and use of categorization and clustering systems are commonly assigned with the present application, and are incorporated herein by reference.

Goutte et al., "Incremental Training for Probabilistic Categorizer", U.S. patent application Ser. No. 11/170,019 filed 29 Jun. 2005 and since published as U.S. Publ. Appl. 2007/0005340 A1 is incorporated by reference herein in its entirety.

Goutte et al., "Method and Apparatus for Explaining Categorization Decisions", U.S. patent application Ser. No. 11/013,365 filed 15 Dec. 2004 and since published as U.S. Publ. Appl. 2006/0136410 A1 is incorporated by reference herein in its entirety.

BRIEF DESCRIPTION

In accordance with certain aspects illustrated herein, a method is disclosed for characterizing a class of a probabilistic classifier or clustering system that includes probabilistic model parameters. For each of a plurality of candidate words or word combinations, divergence of the class from other classes is computed based on one or more probabilistic model parameters profiling the candidate word or word combination. One or more words or word combinations are selected for characterizing the class as those candidate words or word combinations for which the class has substantial computed divergence from the other classes.

In accordance with certain aspects illustrated herein, a method is disclosed for identifying documents or document portions characteristic of a class of a probabilistic classifier or clustering system that includes probabilistic model parameters. For each of a plurality of candidate documents or document portions, a divergence of the candidate document or document portion from the class is computed based on one or more probabilistic model parameters profiling the candidate document or document portion in the class. One or more of the candidate documents or document portions are selected for characterizing the class as those candidate documents or document portions having a smallest divergence from the class.

In accordance with certain aspects illustrated herein, a storage medium is disclosed which stores instructions which when executed by a digital processor perform a method for characterizing classes of a probabilistic classifier or clustering system including (i) computing divergences of classes from other classes respective to candidate word combinations based on probabilistic model parameters of the probabilistic classifier or clustering system, and (ii) characterizing classes using candidate word combinations that provide substantial computed divergence from other classes.

BRIEF DESCRIPTION OF THE DRAWINGS

The FIGURE diagrammatically shows a clustering or categorization system including a divergences-based class characterization system.

DETAILED DESCRIPTION

With reference to the FIGURE, a probabilistic categorization or clustering system 10 has been trained using a set of training documents 12 to identify a set of vocabulary words 14 and probabilistic model parameters 16 suitable for henceforth assigning unclassified documents to one or more classes of a group of classes 20 based on a classifying algorithm 22 that classifies documents based on application of the probabilistic model parameters 16. For convenience of description, the notation $W=\{w_i\}$ is used herein, where $w_i$ (or simply w) denotes a vocabulary word and W denotes the set of vocabulary words 14. Similarly, the notation $D=\{d_m\}$ is used herein, where $d_m$ (or simply d) denotes a training document and D denotes the set of training documents 12 used to train the probabilistic categorization or clustering system 10. Similarly again, the notation $C=\{c_k\}$ is used herein, where $c_k$ (or simply c) denotes a class and C denotes the set of classes 20 of the probabilistic categorization or clustering system 10.

In some embodiments, the probabilistic categorization or clustering system 10 is a probabilistic latent categorization or clustering (PLC) system such as is described, for example, in Goutte et al., U.S. Publ. Appl. 2005/0187892 A1, which is incorporated by reference herein in its entirety. However, the class characterization approaches disclosed herein are suitably applied to other types of probabilistic categorization or clustering systems that generate probabilistic model parameters 16.

If the system 10 is a probabilistic categorization system, then each training document $d_m$ of the set of training documents 12 was provided pre-annotated by one or more classes (for example by a human annotator or by another computer system or other automated annotation system). Thus, the set of classes 20 was constructed prior to initiation of training. The training process extracted the set of vocabulary words 14 and the probabilistic model parameters 16 from the training documents 12, and determined a suitable algorithm for classifying documents into an exclusive class (for hard categorization or partitioning) or into one or more classes (for soft categorization) based on application of the probabilistic model parameters 16. On the other hand, if the system 10 is a probabilistic clustering system, then the set of training documents 12 were not provided with pre-annotation of classes, and the set of classes 20 was constructed as part of the clustering aspect of the training process. The class characterization approaches set forth herein are readily applied to either categorization or classification systems, and to either hard or soft classification.

An example suitable probabilistic model parameter is the probabilistic profile of a vocabulary word w in a training document d given by $P(w|d)=N_w/N_d$ where $N_w$ denotes the number of occurrences of the word w in document d and $N_d$ denotes the number of words in the document d. Another example suitable probabilistic model parameter is the probabilistic profile of a vocabulary word w in a class c given by $P(w|c)=N_w/N_c$ where $N_w$ denotes the number of occurrences of the word w in training documents assigned to class c and $N_w$ denotes the number of words in the training documents assigned to class c. Another example suitable probabilistic model parameter is the probabilistic profile of a document d assigned to a class c given by $P(d|c)=N_d/N_c$ where $N_d$ denotes the number of words in the document d and $N_c$ denotes the number of words in training documents assigned to class c. In some embodiments, the inverse ratio $P(c|d)=N_c/N_d$ may be used in place of or in addition to $P(c|d)$. Another example suitable probabilistic model parameter is the probabilistic profile of a class c given by $P(c)=N_c/N_{total}$ where $N_c$ denotes the number of words in training documents assigned to class c and $N_{total}$ denotes the number of words in all of the training documents 12. It is to be appreciated that the word counts, such as $N_w$, $N_c$, $N_d$, $N_{total}$, and so forth optionally omit counting words of under a certain number of letters, optionally omit or optionally include counting numeric values, optionally count only vocabulary words, or so forth. Moreover, the probabilistic categorization or clustering system 10 may employ some or all of these example probabilistic model parameters, may employ different probabilistic model parameters, or so forth.

The vocabulary 14 can be constructed from the set of training documents 12 in various ways. In some embodiments, the vocabulary 14 includes any word used in more than a threshold number of documents. In some embodiments, the vocabulary 14 includes any word used more than a threshold number of times in the set of training documents 12. In some embodiments, vocabulary words are selected based on their contributions to a divergence between classes. For example, Dobrokhotov et al., "Combining NLP and Probabilistic Categorization for Document and Term Selection for Swiss-Prot Medical Annotation", *Bioinformatics* 19 Suppl. 1:i91-94 (2003)) sets forth a vocabulary words selection method based on word contributions to the Kullback-Leibler divergence between classes.

With continuing reference to the FIGURE, a class characterization system 30 determines keywords, semantic descriptions, or other characterization of the classes $c_k$ of the set of classes 20. A candidate words or word combinations selector 32 selects a plurality of candidate words or word combinations which are candidates for use in characterizing classes. For example, the selector 32 may select the vocabulary words 14, or may access a natural language processing (NLP) parser 34 to extract noun phrases, verb phrases, sentences, or other typically descriptive natural language components from the training documents 12 for uses as the candidate word combinations. In some embodiments, the training documents 12 are themselves treated as candidate word combinations for characterizing the classes 20. In some embodiments, selected portions of the training documents 12, such as document abstracts if present, are treated as candidate word combinations for characterizing the classes 20.

A divergence contributions calculator 40 computes for each class a divergence of the class from other classes based on the probabilistic model parameters 16 profiling each candidate word or word combination. The computed divergences for each word or word combination are indicative of how well the candidate word or word combination distinguishes between classes. A characteristic words or word combinations selector 42 selects one or more words or word combinations for characterizing each class as those candidate words or word combinations for which the class has substantial computed divergence from the other classes. By selecting candidate words or word combinations for which the class has substantial computed divergence from the other classes, the selected words or word combinations effectively distinguish the class from other classes of the set of classes 20. In some embodiments, the divergence contributions calculator 40 computes divergence contributions of candidate documents or other candidate word combinations from a class. In these embodiments, the characteristic words or word combinations selector 42 selects those candidate documents or word combinations that have the smallest divergence from the class, and which therefore are exemplary of the class.

A class characterization processor 44 constructs suitable class characterizations based on the selected words or word combinations. For example, if the candidate words or word combinations include vocabulary words, then the class characterization processor 44 may assign the vocabulary words selected for each class as keywords for that class. On the other hand, if the candidate words or word combinations include training documents, then the class characterization processor 44 may assign the training documents selected for each class as characteristic example documents of that class. If the candidate words or word combinations include natural language phrases or sentences, then the class characterization processor 44 may construct a semantic description of the class based on the natural language phrases or sentences.

With continuing reference to the FIGURE, some examples of suitable implementations of the divergence contributions calculator 40 and selector 42 are set forth. In one approach, the candidate words or word combinations include the set of vocabulary words W 14, and the divergence contributions calculator 40 calculates contributions $\epsilon_w(c_A, c_B)$ to the Kulback-Leibler divergence between a class $c_A$ and another class $c_B$ respective to the vocabulary W 14:

$$\varepsilon_w(c_A, c_B) = (P(w \mid c_A) - P(w \mid c_B)) \cdot \ln\left(\frac{P(w \mid c_A)}{P(w \mid c_B)}\right), \quad (1)$$

where $P(w \mid c_A)$ and $P(w \mid c_B)$ denote the probabilistic model parameters profiling the usage of the candidate word w in classes $c_A$ and $c_B$, respectively, and where $\epsilon_w(c_A, c_B)$ denotes the contribution to the Kulback-Leibler divergence of class $c_A$ from class $c_B$ for the vocabulary word w. Equation (1) applied across the set of classes $C=\{c_k\}$ produces a matrix of divergence elements for each candidate word w with one divergence matrix element $\epsilon_w(c_A, c_B)$ for each ordered pair of classes $(c_A, c_B)$. For example, if the set of classes $C=\{c_k\}$ 20 includes five classes (index k ranging from 1 to 5) then the output of Equation (1) is suitably:

TABLE 1

$\epsilon_w(c_A, c_B)$ Divergence Matrix

| $c_B$ | $c_1$ | $c_2$ | $c_3$ | $c_4$ | $c_5$ |
|---|---|---|---|---|---|
| $c_1$ | 0 | $\epsilon_w(c_1, c_2)$ | $\epsilon_w(c_1, c_3)$ | $\epsilon_w(c_1, c_4)$ | $\epsilon_w(c_1, c_5)$ |
| $c_2$ | $\epsilon_w(c_2, c_1)$ | 0 | $\epsilon_w(c_2, c_3)$ | $\epsilon_w(c_2, c_4)$ | $\epsilon_w(c_2, c_5)$ |
| $c_3$ | $\epsilon_w(c_3, c_1)$ | $\epsilon_w(c_3, c_2)$ | 0 | $\epsilon_w(c_3, c_4)$ | $\epsilon_w(c_3, c_5)$ |
| $c_4$ | $\epsilon_w(c_4, c_1)$ | $\epsilon_w(c_4, c_2)$ | $\epsilon_w(c_4, c_3)$ | 0 | $\epsilon_w(c_4, c_5)$ |
| $c_5$ | $\epsilon_w(c_5, c_1)$ | $\epsilon_w(c_5, c_2)$ | $\epsilon_w(c_5, c_3)$ | $\epsilon_w(c_5, c_4)$ | 0 |

Each divergence matrix element $\epsilon_w(c_A, c_B)$ measures how discriminative word w is for differentiating classes $c_A$ and $c_B$. Those vocabulary words with the largest contributions $\epsilon_w$ are suitably selected as keywords. Optionally, contributions are normalized in order to be comparable from class to class. This has no influence on the ranking of the keywords, but may have an influence on the choice of the number of keywords. In one example embodiment of the selector 42, enough keywords are chosen to cover a selected percentage of the total Kulback-Leibler divergence contribution. Optionally, this technique may also be used to find "anti-keywords", that is, keywords that are more atypical for a class than they are for others. Those are negative divergence matrix elements $\epsilon_w(c_A, c_B)$.

An example variation of Equation (1) is:

$$\varepsilon_w(c_A) = (P(w \mid c_A) - P(w \mid C)) \cdot \ln\left(\frac{P(w \mid c_A)}{P(w \mid C)}\right), \quad (2)$$

where P(w|C) denotes the probabilistic model parameter profiling the usage of the vocabulary word w in all of the classes $C=\{c_k\}$ 20, and $\epsilon_w(c_A)$ denotes the divergence vector element indicating the contribution of word w to the divergence of the class $c_A$ from the average of the other classes. Equation (2) applied across the set of classes $C=\{c_k\}$ produces a vector of divergence elements for each candidate word w with one divergence vector element $\epsilon_w(c_A)$ for each class $c_A$. For example, if the set of classes $C=\{c_k\}$ 20 includes five classes (index k ranging from 1 to 5) then the output of Equation (2) is suitably:

TABLE 2

$\epsilon_w(c_A)$ Divergence Vector

| $c_A$ | $\epsilon_w(c_A)$ |
|---|---|
| $c_1$ | $\epsilon_w(c_1)$ |
| $c_2$ | $\epsilon_w(c_2)$ |
| $c_3$ | $\epsilon_w(c_3)$ |
| $c_4$ | $\epsilon_w(c_4)$ |
| $c_5$ | $\epsilon_w(c_5)$ |

The approach of Equation (2) is less computationally intensive than the approach of Equation (1), but provides less selection information for choosing keywords since a keyword that is highly distinguishing between classes $c_1$ and $c_3$, for example, may nonetheless have a small contribution to the overall divergence vector $\epsilon_w(c_1)$ if that keyword is not very useful for distinguishing class $c_1$ from the other classes $c_2$, $c_4$, and $c_5$.

The example word-based implementations of the divergence contributions calculator 40 set forth with reference to Equations (1) and (2) provide discriminating words from which the class characterization processor 44 can readily construct a set of keywords for labeling classes. Such keywords provide a convenient basis for automated keyword-based searching of the probabilistic categorization or clustering system 10. However, the user may find that keywords provide less than fully satisfactory class descriptions for manually browsing the classes. The user presented with a list of keywords labeling a class must make his or her own inferences as to how those keywords collectively set forth the content of the class. For the purpose of browsing classes, the user may be better served by being provided with characteristic phrases, characteristic example documents, or other characteristic semantic word combination class labels that more fully describe or exemplify content of the class.

In some embodiments, the divergence contributions calculator 40 and selector 42 are configured to identify characteristic documents from the set of training documents 12 that exemplify each class. The Kulback-Leibler divergence between a class $c_A$ and another class $c_B$ respective to the set of training documents D 12 is suitably denoted $KL_D(c_A, c_B)$ herein, and is suitably given by:

$$KL_D(c_A, c_B) = \sum_{d \in D} \eta_d(c_A, c_B), \quad (3)$$

where in Equation (3) the term $\eta_d(c_A, c_B)$ denotes the contribution of training document d to the Kulback-Leibler divergence between classes $c_A$ and $c_B$, given by:

$$\eta_d(c_A, c_B) = (P(d|c_A) - P(d|c_B)) \cdot \ln\left(\frac{P(d|c_A)}{P(d|c_B)}\right), \quad (4)$$

where $P(d|c_A)$ and $P(d|c_B)$ denote the probabilistic model parameters profiling the candidate document d in classes $c_A$ and $c_B$, respectively. Equation (4) applied across the set of classes $C=\{c_k\}$ produces a matrix of divergence elements for each candidate document d with one divergence matrix element $\eta_d(c_A, c_B)$ for each ordered pair of classes $(c_A, c_B)$ indicating how effective the candidate document d is at discriminating between the classes $c_A$ and $c_B$.

In some embodiments, Equation (4) is modified as:

$$\eta_d(c_A) = (P(d|c_A) - P(d|C)) \cdot \ln\left(\frac{P(d|c_A)}{P(d|C)}\right), \quad (5)$$

where $P(d|C)$ denotes the probabilistic model parameter profiling the document d respective to all the classes $C=\{c_k\}$ 20, and $\eta_d(c_A)$ denotes the divergence vector element indicating contribution of document d to the divergence of the class $c_A$ from the average of the other classes. Equation (5) applied across the set of classes $C=\{c_k\}$ produces a vector of divergence elements for each candidate document d with one divergence vector element $\eta_d(c_A)$ for each class $c_A$.

Using the document probabilities $P(d|c)$ can be problematic if documents vary substantially in length, since longer documents will typically have a higher probability $P(d|c)$. This is suitably compensated by employing the posterior class probability $P(c|d)$, so documents with the largest posterior for a class may be good candidates for class labeling.

In cases in which the training documents are relatively large, a document may be a disadvantageously large unit for providing a useful idea of the content of a class. In typical probabilistic categorization or clustering systems, however, the notion of document is arbitrary, so smaller portions of documents, such as paragraphs, or even sentences, may be considered as "documents". For each document portion, a class-conditional probability $P(d|c)$ (or posterior $P(c|d)$) is computed, and exemplary document parts are selected for each class using selected criteria of Equations (3)-(5). This approach is simple to implement because it is based on probabilistic model parameters available as a result of the clustering or training phase.

In the case of hard assignment, a problem arises in applying Equations (3)-(5). In hard assignment or partitioning, each document is assigned to a single class. Accordingly, $P(d|c)=0$ except for the assigned class. In some embodiments, this difficulty is addressed by keeping the class profiles $P(w|c)$ fixed and re-estimating $P(d|c)$ by maximizing the likelihood, for example using entropy maximization or another suitable technique. This is typically fast and does not call for expensive optimization techniques such as deterministic annealing. The re-estimated values of $P(d|c)$ may be used in Equations (3)-(5) to look for typical documents or document portions, while retaining the hard assignment or partitioning for interactions with the user.

Another approach to applying Equations (3)-(5) in the case of hard assignment is to use the empirical profile of a document, denoted herein as $\hat{P}(w|d) \propto N_{wd}$, that is, the empirical frequency of words in documents. The closer these empirical frequencies are to the conditional probabilities in the class profile, the more typical this document is of the corresponding class. This closeness may be expressed by a divergence, such as a Kulback-Leibler divergence:

$$KL(d, c) = \sum_{w \in W} (\hat{P}(w|d) - P(w|c)) \cdot \ln\left(\frac{\hat{P}(w|d)}{P(w|c)}\right), \quad (6)$$

or as a Euclidean distance, or so forth. The document or documents with the lowest divergence from the class c as computed by the divergence contributions calculator 40, that is, the document or documents having the lowest divergence value $KL(d, c)$, are the most typical of class c and hence are suitably selected as prototypical examples of class c by the characteristic words or word combinations selector 42. Note that in this approach a document length bias exists. The class profiles are relatively more influenced by longer documents, which introduces a systematic decrease of the divergence. Also, the empirical profile is estimated with a quantization level that depends of the document length (for example, in the case of a very short document consisting of two words, the empirical frequencies are limited to 0, 0.5 or 1). Longer documents may therefore be able to yield finer empirical frequencies and therefore a smaller divergence. The document length bias (other than quantization) is suitably compensated by normalizing by the document length or other similar techniques.

The example document-based implementations of the divergence contributions calculator 40 set forth with reference to Equations (3)-(6) provide example documents that are class-discriminating or class-representative. These documents can help the user to browse the classes probabilistic categorization or clustering system 10.

In other example embodiments, the candidate word combinations selected by the candidate words or word combinations selector 32 are phrases, such as noun phrases identified by the natural language parser 34. Noun phrases can be identified using dedicated linguistic tools, for example based on syntactic patterns, or by a statistical approach based, for example, on collocations. The divergence contributions calculator 40 in these embodiments calculates a divergence contribution for each noun phrase which combines the estimated divergence contributions $\epsilon_w$ of the words in the noun phrase and the document divergence contributions $\eta_d$ of the documents in which the noun phrase is found. One suitable phrasal divergence contribution expression, denoted DIV(NP), that is characteristic of a noun phrase (NP) is given by:

$$DIV(NP) = \frac{1}{2} \cdot \left( \frac{1}{|NP|} \cdot \sum_{w \in NP} \epsilon_w + \frac{1}{|d \mid NP \in d|} \cdot \sum_{d, NP \in d} \eta_d \right), \quad (7)$$

which employs an arithmetic combination of (i) a word-based divergence based on one or more probabilistic model parameters of the probabilistic classifier or clustering system 10 that profile one or more words of the candidate noun phrase and (ii) a phrase-based divergence based on one or more probabilistic model parameters of the probabilistic classifier or clustering system 10 that profile those training documents containing the candidate phrase. Other suitable phrasal divergence contributions may include geometric averaging for the combination, for example using the maximum contribution rather than average, or so forth. The characteristic words or word combinations selector 42 labels the class by picking the noun phrases having the top phrasal divergence contributions.

Because probabilistic classifier or clustering systems typically are able to identify typical parts inside a document, application of the divergence contribution formula of Equation (7) optionally focuses on those typical parts, rather than searching for relevant phrases throughout the entire documents. This is especially useful with soft assignment, where all documents may be assigned to all classes with a non-zero probability. Moreover, the example phrasal divergence contribution formula of Equation (7) is optionally applied to phrases other than noun phrases (such as verb phrases or so forth), optionally including phrasal text units larger than noun phrases, such as clauses, sentences, paragraphs, or so forth.

In some embodiments in which the candidate words or word combinations are phrases or sentences (where phrases broadly includes portions of documents such as abstracts or so forth), the characteristic words or word combinations selector 42 employs a multi-document summarization approach. Such approaches are known for summarizing, for example, clusters of documents returned by search engines. Typical multi-document summarization employing sentence units involves: (i) calculating the weight of words in the collection using some heuristics; (ii) combining word weights in each sentence to calculate a sentence score; and (iii) ranking the sentences according to score and outputting a certain number of top-ranked sentences to achieve a desired summary text length. In applying multi-document summarization techniques, the characteristic words or word combinations selector 42 imposes constraints, such that the multi-document summarization is adapted to provide a useful description. In particular, the classification model provides information on which words are more or less important in the context of each class, and which documents are more or less prototypical of the class. In order to obtain an informative summary describing the content of a class, the multi-document summarization is constrained to favor sentences or other word combinations from prototypical documents as well as to favor sentences or other word combinations that contain important words (for example in the sense of the Kulback-Leibler divergence contributions set forth herein). The importance (or weight) of a word for a class is known from the model using, for example, the word-based divergence contributions $\epsilon_w$. The sentence or other word combination score further takes into account the importance of the document (or document part) the sentence was extracted from, for example using the document-based divergence contributions $\eta_d$. (For hard partitioning, sentences are extracted only from documents belonging to the owning class). One suitable embodiment of the characteristic words or word combinations selector 42 which uses a multi-document summarization technique is as follows: (i) combine word contributions in each sentence to calculate a sentence score; (ii) calculate the weighted sentence score by multiplying it by the contribution of the document (or document portion) the sentence was extracted from (for identical sentences, accumulate or filter the weighted scores); and (iii) rank the sentences according to the weighted score and output the top-ranked sentences (depending on the desired summary length). The thusly extracted sentences meet two goals: they contain words that are important to the class, and they come from documents that are typical of the class.

In general, the class labeling approaches disclosed herein are applicable to a continuum of word combinations ranging from individual words to whole documents.

In some probabilistic categorization or clustering systems the probabilistic model parameters may be updated after the initial training as unclassified documents are assigned to classes. Some suitable approaches for updating the probabilistic model parameters as later unclassified documents are processed by the system are disclosed in Goutte et al., "Incremental Training for Probabilistic Categorizer", U.S. patent application Ser. No. 11/170,019 filed 29 Jun. 2005, which is incorporated by reference herein in its entirety. The class characterization approaches disclosed herein are readily applied to such systems that update the probabilistic model parameters. Optionally, the class characterization system 30 is re-applied occasionally to ensure that the class labels remain up-to-date as the probabilistic model parameters are updated by processing of new unclassified documents.

The illustrated probabilistic categorization or clustering system 10 is a one-dimensional system having a single class dimension including the set of classes $C=\{c_k\}$. Some systems may employ a multi-dimensional classification system, such as a two-dimensional classification system having a first class dimension $C^{(1)}=\{c_k^{(1)}\}$ and a second class dimension $C^{(2)}=\{c_k^{(2)}\}$. Multi-dimensional classification systems are disclosed for example in U.S. Publ. Appl. 2005/0187892 A1, which is incorporated by reference herein in its entirety, and in Gaussier et al., "Categorization including Dependencies between Different Category Systems", U.S. patent application Ser. No. 11/170,033 filed 29 Jun. 2005 which is incorporated by reference herein in its entirety. The class characterization approaches disclosed herein are readily applied to class labeling in probabilistic categorization or clustering systems employing either the illustrated single-dimensional, or multi-dimensional, classification systems.

The class characterization system 30 can be physically embodied in various ways. Typically, a storage medium stores instructions which when executed by a digital processor perform class characterization in accordance with the described operation of the class characterization system 30. The storage medium can be, for example, a magnetic disk, an optical disk, a read-only memory (ROM), a random-access memory (RAM), a storage medium of a network server, or so forth. The digital processor can be, for example, a digital computer, a digital calculator, a microprocessor, a microcontroller, network server, or so forth. In some embodiments, the storage medium and the digital processor may be integrated as a unit. For example, a desktop, laptop, or other computer may include a hard drive serving as the storage medium and a microprocessor and/or other digital circuitry serving as the digital processor. In other embodiments, the storage medium and digital processor may be distinctly separate. For example, the instructions may be stored on a remote storage medium connected with a network, and executed by a processor of a computer connected with the network. The instructions stored on the storage medium may access library functions or other instructions stored elsewhere to perform certain operations of the class characterization system 30. For example, the instructions stored on the storage medium which when executed by a digital processor perform the class characterization may include instructions accessing remotely stored mathematical library functions that perform certain mathematical operations of the class characterization system 30.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for characterizing a class of a probabilistic classifier or clustering system that classifies or clusters documents into classes and includes probabilistic model parameters, the method comprising:

for each of a plurality of candidate words or word combinations wherein the candidate words or word combinations include natural language phrases, computing a divergence element of the class from each of a plurality of other classes of the probabilistic classifier or clustering system based on one or more probabilistic model parameters profiling the candidate word or word combination; and selecting one or more words or word combinations including at least one natural language phrase for characterizing the class as those candidate words or word combinations for which the class has a substantial computed divergence element from at least one of the plurality of other classes of the probabilistic classifier or clustering system that is effective for distinguishing the class from at least one of the plurality of other classes; and labeling the class based on the selected one or more words or word combinations, the labeling including constructing a semantic description of the class based on the at least one selected natural language phrase;

wherein the computing a divergence operation and the selecting operation and the labeling operation are performed by a digital processor.

2. The method as set forth in claim 1, wherein the computing of divergence elements comprises:

computing a Kulback-Leibler divergence element of the class from each of the plurality of other classes of the probabilistic classifier or clustering system.

3. The method as set forth in claim 1, wherein the candidate words or word combinations include training documents.

4. The method as set forth in claim 1, wherein the natural language phrases include noun phrases.

5. The method as set forth in claim 1, wherein the candidate words or word combinations further include sentences.

6. The method as set forth in claim 5, wherein the selecting comprises:

performing a multi-document summarization ranking of the candidate natural language phrases or sentences based on the computed divergences.

7. The method as set forth in claim 1, wherein:

the computing of a divergence element of the class from each of the other classes is repeated for each class of the probabilistic classifier or clustering system to generate a matrix of divergence elements for each candidate word or word combination, and the selecting comprises selecting a plurality of word or word combinations for differentiating classes of the probabilistic classifier or clustering system, the selecting being based on the generated matrices of divergence elements.

8. A storage medium storing instructions which when executed by a digital processor perform a method for characterizing classes of a probabilistic classifier or clustering system including (i) computing divergences of classes from other classes respective to candidate phrases based on probabilistic model parameters of the probabilistic classifier or clustering system, and (ii) characterizing classes using candidate phrases that provide substantial computed divergence from other classes effective for distinguishing the class from other classes, wherein the divergences computing (i) includes:

computing a word-based divergence based on one or more probabilistic model parameters of the probabilistic classifier or clustering system that profile one or more words of the candidate phrase, computing a phrase-based divergence based on one or more probabilistic model parameters of the probabilistic classifier or clustering system that profile training documents containing the candidate phrase, and combining the word-based divergence and the phrase-based divergence to determine the divergence.

9. The storage medium as set forth in claim 8, wherein the method performed by the instructions when executed by a digital processor further includes (iii) deriving the candidate phrases by natural language processing of training documents used to train the probabilistic classifier or clustering system.

10. The storage medium as set forth in claim 8, wherein the candidate phrases include noun phrases.

11. The storage medium as set forth in claim 8, wherein the characterizing (ii) includes performing a multi-document summarization ranking of the candidate phrases based on the computed divergences.

12. A method for characterizing a class of a probabilistic classifier or clustering system that classifies or clusters documents into classes and includes probabilistic model parameters, the method comprising:

for each of a plurality of candidate words or word combinations, computing a divergence element of the class from each of a plurality of other classes of the probabilistic classifier or clustering system based on one or more probabilistic model parameters profiling the candidate word or word combination; and selecting one or more words or word combinations for characterizing the class as those candidate words or word combinations for which the class has a substantial computed divergence element from at least one of the plurality of other classes of the probabilistic classifier or clustering system that is effective for distinguishing the class from at least one of the plurality of other classes; and labeling the class based on the selected one or more words or word combinations;

wherein the computing a divergence operation and the selecting operation and the labeling operation are performed by a digital processor.

* * * * *